C. C. BITNER.
Apparatus for Obtaining Metallic Copper from its Solutions.
No. 213,382.       Patented Mar. 18, 1879.
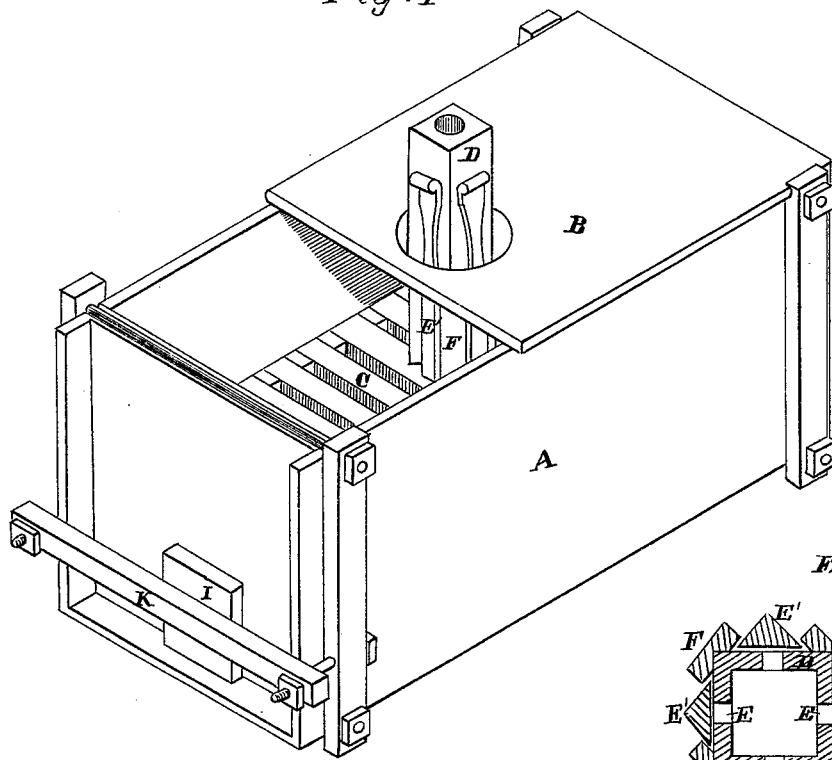
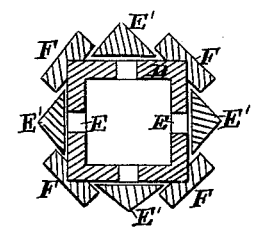
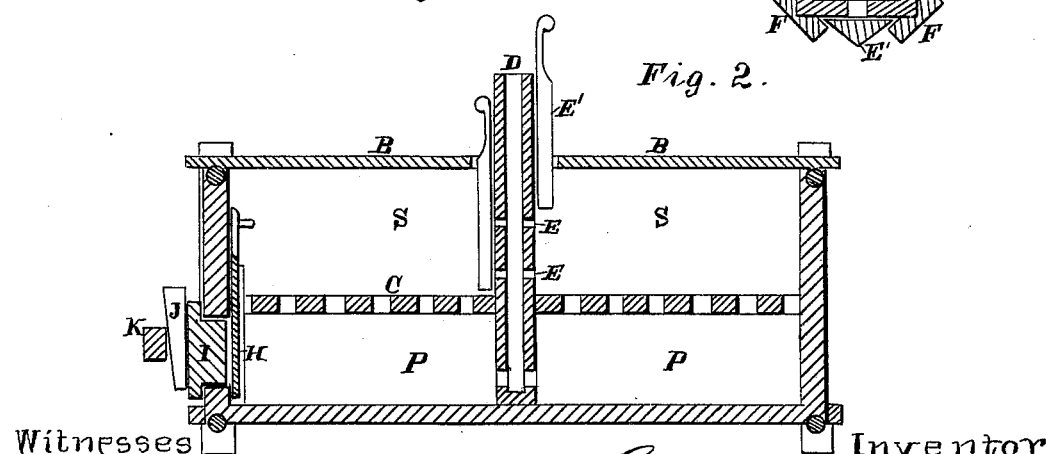

UNITED STATES PATENT OFFICE.

CYRUS C. BITNER, OF SPENCEVILLE, CALIFORNIA.

IMPROVEMENT IN APPARATUS FOR OBTAINING METALLIC COPPER FROM ITS SOLUTION.

Specification forming part of Letters Patent No. 213,382, dated March 18, 1879; application filed October 28, 1878.

*To all whom it may concern:*

Be it known that I, CYRUS C. BITNER, of Spenceville, county of Nevada, and State of California, have invented a Method and Apparatus for Producing Metallic Copper; and I do hereby declare the following to be a full, clear, and exact description thereof, reference being had to the accompanying drawings.

Figure 1 is a perspective view of my invention. Fig. 2 is a longitudinal section. Fig. 3 is a horizontal section of the pipe D.

My invention relates to a novel apparatus for obtaining metallic copper from its solution; and it consists in the employment of a tank or vat having a horizontal perforated diaphragm, upon which is placed a quantity of iron. This tank is filled with a solution of copper previously prepared from the roasted ore in the usual manner. Through the top of this tank a steam-pipe passes and extends below the diaphragm, so that the solution is heated by this injected steam, and by the motion which its action gives the deposition of the copper is hastened. By means of peculiarly-arranged slides the steam is admitted above the diaphragm through holes in the steam-pipe to assist the process, if desired.

In order to more fully explain my invention, reference is made to the accompanying drawings.

In places where leaching is carried on, where copper is obtained on a large scale in a solution from which it has to be precipitated, it is usually done in a large cylindrical vessel, in which pieces of iron are placed. If not done in this way the solution is placed in a vat, on the bottom of which scrap-iron is thrown, and then left until the iron precipitates the copper in a metallic form. In these methods the iron has to be removed before the copper can be taken out. The copper precipitates on the iron in the tanks or cylindrical vessels in such a manner that it is difficult to separate the metals, the operation involving considerable manual labor.

In the process I have devised the chemical action is just the same as formerly; but the details of construction of the tank and operation of the steam are such that the work is quickly performed.

Let A represent an oblong tank or vessel, into which the solution containing the copper is drawn. This tank is strengthened by supports and tie-rods, as shown, and has a cover, B. Extending entirely across this tank a short distance above the bottom is a wooden grating or perforated diaphragm, C. In the center of the tank is the square upright wooden tube D, the bottom of which is closed. Perforations E are made at different points in this tube, and steam is injected in the top of said tube, which may pass out of any of the perforations which may be open.

The lower perforations are under the horizontal grating, and the steam ordinarily passes out of these openings; but when it is desired to allow steam to come out above the grating the operator has it under control. This control is effected by the slides E, fitting in the dovetail joints formed by the corner-pieces F. These slides have rubber faces, and may be slid up or down, as the operator desires. As they are slid up the holes are opened at any desired point. Being fitted to slide in the overlapping corner-pieces, the pressure of steam cannot press them out of place.

The scrap-iron is thrown down on the perforated diaphragm or grating and the solution admitted to the tank. The iron precipitates the copper in the solution, which action is facilitated by the heat furnished by the steam. As the copper precipitates, some of it falls to the bottom chamber, P, of the tank, and some of it on the iron or on the grating in the upper chamber, S.

After the solution has been drawn off, by moving the slide up and allowing steam to escape from higher orifices the steam blows or washes the precipitated copper from the iron and throws it to the bottom of the tank.

The precipitated copper may be washed out of the tank through the opening which is closed by the gate H. This opening is tightly closed on the outside by the wooden plug I, a wedge, J, being placed between this plug and the brace K, as shown. By this means, when copper is precipitated from a solution, it may be removed from the tank without renewing the iron, said iron being thoroughly cleaned of the copper by the action of the steam.

The heat furnished by the steam greatly facilitates the precipitations in the solution, and is furnished by the same pipe which washes off the iron.

Steam may be turned off at any moment during the precipitation when it is desired. The steam will also agitate the solution in such a manner that the precipitated copper will be washed from the iron and fall through the grating onto the bottom.

Having thus described my invention, what I claim as new, and desire to secure by Letters Patent, is—

The tank A, with its upper and lower chambers, S P, for deposition and collection, respectively, in combination with the perforated steam-pipe D, having the slides or valves E', to control the openings and allow the steam to be discharged below the diaphragm or above it, substantially as and for the purpose herein described.

In witness whereof I have hereunto set my hand and seal.

CYRUS C. BITNER. [L. S.]

Witnesses:
 FRANK A. BROOKS,
 WALTER C. BEATIE.